(12) United States Patent
Yu et al.

(10) Patent No.: US 11,642,811 B2
(45) Date of Patent: May 9, 2023

(54) ENVIRONMENT-FRIENDLY MILDEW PREVENTION METHOD FOR BAMBOO

(71) Applicant: International Center for Bamboo and Rattan, Beijing (CN)

(72) Inventors: Zixuan Yu, Beijing (CN); Daochun Qin, Beijing (CN); Rong Zhang, Beijing (CN); Hankun Wang, Beijing (CN)

(73) Assignee: INTERNATIONAL CENTER FOR BAMBOO AND RATTAN, Beijing (CN)

( * ) Notice: Subject to any disclaimer, the term of this patent is extended or adjusted under 35 U.S.C. 154(b) by 0 days.

(21) Appl. No.: 17/379,493

(22) Filed: Jul. 19, 2021

(65) Prior Publication Data

US 2022/0250274 A1 Aug. 11, 2022

(30) Foreign Application Priority Data

Feb. 6, 2021 (CN) .......................... 202110176143.8

(51) Int. Cl.
*B27K 3/52* (2006.01)
*B27K 9/00* (2006.01)

(52) U.S. Cl.
CPC ............... *B27K 3/52* (2013.01); *B27K 9/002* (2013.01); *B27K 2240/20* (2013.01)

(58) Field of Classification Search
CPC .......... B27K 3/0278; B27K 3/08; B27K 3/16; B27K 3/34; B27K 3/38; B27K 3/50; B27K 3/52; B27K 5/04; B27K 9/002; B27K 2240/20
See application file for complete search history.

(56) References Cited

U.S. PATENT DOCUMENTS

| | | | |
|---|---|---|---|
| 8,901,325 B2 * | 12/2014 | Van Der Heide | C07D 307/48 549/489 |
| 10,358,504 B2 * | 7/2019 | Karppi | C08B 15/02 |
| 10,538,012 B2 * | 1/2020 | Boitouzet | C08H 8/00 |

* cited by examiner

*Primary Examiner* — Michael P Wieczorek
(74) *Attorney, Agent, or Firm* — Goodhue, Coleman & Owens, P.C.

(57) ABSTRACT

The present disclosure provides an environment-friendly mildew prevention method for bamboo. The mildew prevention method for bamboo includes the following steps: soaking the bamboo in an acid solution to obtain a reaction system; subjecting the reaction system to a hydrolysis reaction to obtain a hydrolyzed product; and washing and drying the hydrolyzed product in sequence to obtain mildew-proof bamboo, where the acid solution is an inorganic acid solution or an organic acid solution; the inorganic acid solution has a mass concentration of 0.5-8%; the organic acid solution has a mass concentration of 2-40%. The present disclosure uses an inorganic acid solution or an organic acid solution to treat the bamboo, and reduces the content of starch in the bamboo through a hydrolysis reaction, thereby reducing a carbon source with starch as the main nutrient on which a mildew fungus depends and achieving the purpose of preventing the bamboo from mildewing.

20 Claims, 5 Drawing Sheets

ENVIRONMENT-FRIENDLY MILDEW PREVENTION METHOD FOR BAMBOO

CROSS REFERENCE TO RELATED APPLICATION

This patent application claims the benefit and priority of Chinese Patent Application No. 202110176143.8, filed on Feb. 6, 2021, the disclosure of which is incorporated by reference herein in its entirety as part of the present application.

TECHNICAL FIELD

The present disclosure relates to the technical field of bamboo modification, in particular to an environment-friendly mildew prevention method for bamboo.

BACKGROUND ART

In recent years, there have been studies on modifying wood through citric acid (CA) to improve the dimensional stability of wood (Despot, Radovan; Hasan, Marin; Jug, Matija. *Modified Biological durability of wood by citric acid*. Drvna industrija. 2008(59)2:55-59; X feng, Z Xiao, S Sui, Q Wang, Y Xie. *Esterification of wood with citric acid: The catalytic effects of sodium hypophosphite (SHP)*. DOI: 10.1515/hf-2013-0122). The basic principle is that the CA and wood are subjected to an esterification reaction under certain conditions to make the wood hydrophobic. The modification treatment is conducted under the action of a catalyst, and the esterification reaction is costly and harmful to the environment.

In addition, there have been studies on physically removing soluble sugars and starches from bamboo by means of a hot water circulating device to block the carbon source that mildew relies on, thereby improving the mildew resistance of the bamboo. In a typical method (Yu Zixuan. *Study on the mildew characteristics of bamboo and its green protection technology*), an automatic circulating device is designed for continuous heating. A bamboo sample is fixed in the center of a tank of a sample chamber, and it is heated by injecting deionized water through the circulating device such that a thermostat stabilizes at a predetermined temperature (98-100° C.). The flow direction of the hot water is the same as the direction of the bamboo grain (longitudinal). The tank is sealed to maintain the hot water circulation treatment at 12.5 m/min. After the cycle is over, the sample is repeatedly immersed and washed in the deionized water. After washing, the sample is dried. This method is a physical method and has obvious shortcomings. First, the cycle efficiency is low. Due to the different sizes and accumulation concentrations of the starch granules in the bamboo cell cavities, the use of the hot water circulation method alone can easily lead to insufficient removal of the bamboo starch, and the starch is likely to block the cell cavities after gelatinization. In addition, the equipment needs to reach a high-speed circulation mode, and the energy consumption is high. Second, the treatment scale is limited. The circulating water treatment requires large-scale professional equipment, which requires high energy consumption and high cost. In addition, it is difficult to control the number and specifications of the samples, which greatly limits the surface treatment depth of large-sized samples. Third, the physical treatment is not thorough. The gelatinized starch and other nutrients are likely to remain in the cell cavity, which is suitable for flake-like materials for interior decoration, but not for raw materials with larger volume specifications. In addition, the treated samples are not suitable for outdoor applications.

SUMMARY

An objective of the present disclosure is to provide an environment-friendly mildew prevention method for bamboo. The method provided by the present disclosure is efficient and simple, and makes the bamboo safe and environment-friendly with a prominent mildew-proof effect after treatment.

To achieve the objective of the present disclosure, the present disclosure provides the following technical solutions:

The present disclosure provides an environment-friendly mildew prevention method for bamboo, including the following steps:

soaking the bamboo in an acid solution to obtain a reaction system;

subjecting the reaction system to a hydrolysis reaction to obtain a hydrolyzed product; and washing and drying the hydrolyzed product in sequence to obtain mildew-proof bamboo, where the acid solution is an inorganic acid solution or an organic acid solution; the inorganic acid solution has a mass concentration of 0.5-8%; the organic acid solution has a mass concentration of 2-40%.

Preferably, the inorganic acid solution may be a hydrochloric acid solution; the organic acid solution may be an acetic acid solution, a propionic acid solution, a citric acid (CA) solution or an oxalic acid solution.

Preferably, the soaking may be conducted under a negative pressure of −0.08 MPa for less than 8 h.

Preferably, a mass ratio of the bamboo to the acid solution may be 1:(5-40).

Preferably, the soaking may be conducted at 25-45° C.

Preferably, the hydrolysis reaction may be conducted at 30-90° C. for 0.5-8 h.

Preferably, the washing may include water washing or alkaline washing.

Preferably, the drying may be conducted at 40-110° C. for 0.5-6 h.

The present disclosure provides an environment-friendly mildew prevention method for bamboo, including the following steps: soaking the bamboo in an acid solution to obtain a reaction system; subjecting the reaction system to a hydrolysis reaction to obtain a hydrolyzed product; and washing and drying the hydrolyzed product in sequence to obtain mildew-proof bamboo, where the acid solution is an inorganic acid solution or an organic acid solution; the inorganic acid solution has a mass concentration of 0.5-8%; the organic acid solution has a mass concentration of 2-40%. In the present disclosure, parenchyma cells of the bamboo are filled with a large number of starch granules, which is the main reason why the bamboo is vulnerable to attack by organisms (especially stain fungi and ambrosia beetles). Starch is widely present in different tissues in plants. It includes amylose and amylopectin, the ratio of which varies depending on the source. Bamboo starch is mainly stored in the parenchyma cells, aggregated in granular form and bulky. The present disclosure uses an inorganic acid solution or an organic acid solution to treat the bamboo, and reduces the content of starch in the bamboo through a hydrolysis reaction, thereby reducing a carbon source with starch as the main nutrient on which a mildew fungus depends and achieving the purpose of preventing the bamboo from mildewing.

DETAILED DESCRIPTION OF THE EMBODIMENTS

The present disclosure provides an environment-friendly mildew prevention method for bamboo, including the following steps:

Soak the bamboo in an acid solution to obtain a reaction system.

Subject the reaction system to a hydrolysis reaction to obtain a hydrolyzed product.

Wash and dry the hydrolyzed product in sequence to obtain mildew-proof bamboo.

The acid solution is an inorganic acid solution or an organic acid solution; the inorganic acid solution has a mass concentration of 0.5-8%; the organic acid solution has a mass concentration of 2-40%.

The present disclosure soaks the bamboo in an acid solution to obtain a reaction system. The present disclosure has no special requirements for the type and size of the bamboo, and all kinds of bamboo known to those skilled in the art are suitable for the solution of the present disclosure. In the present disclosure, the bamboo is preferably oven-dried before soaking, so as to remove moisture in a cell cavity and facilitate the acid solution to enter into the cell cavity.

In the present disclosure, the acid solution is an inorganic acid solution or an organic acid solution; the inorganic acid solution has a mass concentration of 0.5-8%, preferably 0.7-2%; the organic acid solution has a mass concentration of 2-40%, preferably 6-20%. In the present disclosure, the inorganic acid solution is preferably a hydrochloric acid solution; the organic acid solution is preferably an acetic acid solution, a propionic acid solution, a citric acid (CA) solution or an oxalic acid solution, more preferably an oxalic acid solution.

In a specific example of the present disclosure, the CA solution has a mass concentration of preferably 2-10%, specifically preferably 2%, 4%, 6%, 8% or 10%. In the present disclosure, CA reacts with substances such as starch, sugar and fat to convert part of starch, sucrose, etc. into substances such as glucose, xylose and fructose. This reduces the content of starch in the bamboo, thereby reducing a carbon source with starch as the main nutrient on which a mildew fungus depends. Meanwhile, CA also undergoes amidation and esterification reactions with amino groups and hydroxyl groups of bamboo molecules and hydroxyl groups of starch molecules, which is beneficial to improve the mildew resistance of the bamboo.

In the present disclosure, a mass ratio of the bamboo to the acid solution is preferably 1:(5-40), more preferably 1:(10-20).

In the present disclosure, the soaking is preferably conducted under a negative pressure of −0.08 MPa. The present disclosure conducts the soaking under a negative pressure, such that the acid solution quickly fills the cell cavities of the bamboo, and the acid solution contacts the bamboo starch granules to gelatinize the starch, and monosaccharides such as glucose are generated through the subsequent hydrolysis reaction.

In the present disclosure, the soaking is conducted at preferably 25-45° C. for preferably less than 8 h, more preferably 1-5 h.

After obtaining the reaction system, the present disclosure subjects the reaction system to a hydrolysis reaction to obtain a hydrolyzed product. In the present disclosure, the hydrolysis reaction is preferably conducted in a closed vessel. In the present disclosure, the hydrolysis reaction is conducted at preferably 30-90° C., more preferably 60-80° C., for preferably 0.5-8 h, more preferably 2.5-5 h. The present disclosure decomposes the starch granules in the bamboo into monosaccharides such as glucose, xylose and fructose through the hydrolysis reaction, and reduces the content of starch in the bamboo, thereby reducing the carbon source with starch as the main nutrient on which a mildew fungus depends and achieving the purpose of preventing the bamboo from mildewing.

In the present disclosure, the hydrolyzed product refers to the bamboo hydrolyzed by the acid solution.

After obtaining the hydrolyzed product, the present disclosure washes and dries the hydrolyzed product in sequence to obtain mildew-proof bamboo. In the present disclosure, the washing preferably includes water washing or alkaline washing. The present disclosure conducts the washing to remove the acid solution that is not reacted and substances such as soluble sugar generated after the hydrolysis reaction. In the present disclosure, the water washing is preferably deionized water washing, and the water washing is preferably conducted under a heating condition, more preferably under a boiling condition. In the present disclosure, the water washing is conducted for preferably 0.5-2 h each time. The present disclosure has no special requirements for the number of water washing, as long as a washing liquid is neutral. The present disclosure has no special requirements for a washing liquid for the alkaline washing, and an alkaline liquid well known to those skilled in the art can be used. The present disclosure neutralizes the alkaline liquid and the unreacted acid solution through the alkaline washing. The present disclosure has no special requirements for the number of alkaline washing, as long as the washing liquid is neutral.

In the present disclosure, the drying is conducted at preferably 40-110° C., more preferably 50-103° C., for preferably 0.5-6 h, more preferably 2-3 h.

The technical solutions of the present disclosure will be clearly and completely described below with reference to the examples of the present disclosure. Apparently, the described examples are merely some rather than all of the examples of the present disclosure. All other examples obtained by a person of ordinary skill in the art based on the examples of the present disclosure without creative efforts should fall within the protection scope of the present disclosure.

Example 1

An acetic acid solution, a propionic acid solution, an oxalic acid solution and a CA solution with a mass concentration of 2% and a hydrochloric acid solution with a mass concentration of 0.7% were prepared respectively. Oven-dried bamboo samples (finely planed moso bamboo strips, 50 mm×20 mm×5 mm) were respectively put into reaction kettles with the acid solutions, where a mass ratio of the bamboo strip to the acid solution was 1:15. The bamboo strips were soaked under −0.08 MPa at 25° C. for 1 h to obtain a reaction system.

The reaction system was transferred into a drying box and was held at 90° C. for 3 h for a hydrolysis reaction.

After the hydrolysis reaction was over, the samples were washed in boiling deionized water until the aqueous solution was close to neutral. Then all the samples were taken out and dried for later use.

Experimental Results:

Depending on the types of the acids and test mildews, an initial growth time of hyphae on a surface of the treated bamboo was delayed. In a $1^{st}$ week of the test, the hyphae of each fungus species were sparse or invisible on the surface of the bamboo treated with oxalic acid, CA and hydrochloric acid, indicating that the mildew resistance of the bamboo was better than that of the bamboo treated with acetic acid and propionic acid. In the $2^{nd}$ and $3^{rd}$ weeks of the test, the reproduction of *Trichoderma viride* was still slow and the hyphae were sparse. In the $4^{th}$ week of the test, all bamboo surfaces were infected by various fungi, showing different infection rates. The oxalic acid and CA showed better resistance against *Penicillium citrinum* than the other three acids, that is, the treated bamboo eventually had a smaller infection area with a lower mycelial density.

Example 2

A CA solution with a mass concentration of 4% was prepared, and oven-dried bamboo samples (finely planed moso bamboo strips, 50 mm×20 mm×5 mm) were put into reaction kettles with the acid solution, where a mass ratio of the bamboo strip to the acid solution was 1:10. The bamboo strips were soaked under −0.08 MPa at 25° C. for 1 h to obtain a reaction system.

The reaction system was transferred into a drying box and was held at 90° C. for 2.5 h for a hydrolysis reaction.

After the hydrolysis reaction was over, the bamboo was boiled in deionized water for 2 h and washed repeatedly until the aqueous solution was neutral. The washed bamboo was taken out and dried at 103° C. for 6 h to obtain mildew-proof bamboo.

The mildew resistance of the bamboo was tested as per GB/T 18261-2000, and bamboo samples without a mildew prevention treatment were used as a control group.

I. Initial Mildewing Time of Bamboo

The samples were tested in a mildew test box. For the control group, the initial appearance time of *Aspergillus niger, Penicillium citrinum* and *Trichoderma viride* mycelia was the 2nd day, and the initial appearance time of a blue stain fungus mycelium was the $3^{rd}$ day. For the mildew-proof bamboo prepared in Example 2, the initial appearance time of the mycelia was delayed. The initial appearance time of the *Aspergillus niger* mycelium was delayed to the $3^{rd}$ day; the initial appearance time of the *Penicillium citrinum* and *Trichoderma viride* mycelia was the $4^{th}$ day; the initial appearance time of the blue stain fungus mycelium was the $10^{th}$ day.

II. Mildewing Rate of Bamboo

The mildew-proof bamboo prepared in Example 2 was placed in a mildew test box for a 4-week mildew test. The results show that the mildewing rate of the mildew-proof bamboo in four different fungal environments was reduced. After the treatment with the 4% CA solution, the mycelial infection areas of the *Aspergillus niger, Penicillium citrinum, Trichoderma viride* and blue stain fungus were analyzed and calculated, and the mildewing rates of the samples were 35%, 50%, 74% and 28%, respectively.

The mildewing rate of the sample was analyzed by an image analysis method as follows:

(1) Read a source image into a Matlab software system, and sharpen the source image to highlight an image detail.

(2) Correct an orientation of the source image, and segment the source image to obtain a target sample.

(3) Convert the segmented sample into a grayscale image, find a threshold for segmentation between a background and a target by using a maximum between-cluster variance method, and binarize the image.

(4) Find a point with a pixel value of 0 (black point) on the binarized image: (index=find (patch_bw==0)), calculate a ratio of black pixels in background pixels:(acc=numel (index)/(size (patch,1)*size (patch,2))), and obtain a result (fprintf('ratio: %0.3f %%\n', acc*100)), which is the mildewing rate of the tested sample.

III. Soluble Sugar Content in Hydrolysates and Soluble Sugars and Starch Content Remained in Bamboo After the treatment with the 4% CA solution, high performance liquid chromatography (HPLC) was performed. A variety of monosaccharides were found in the hydrolysates, mainly glucose and xylose, which were 310 mg/L and 338 mg/L, respectively. The residual soluble sugar and starch in the bamboo were 43 mg/g and 46 mg/g, respectively, and a weight loss rate of the bamboo was 6%.

Example 3

A CA solution with a mass concentration of 6% was prepared, and oven-dried bamboo samples (finely planed moso bamboo strips, 50 mm×20 mm×5 mm) were put into reaction kettles with the acid solution, where a mass ratio of the bamboo strip to the acid solution was 1:10. The bamboo strips were soaked under −0.08 MPa at 25° C. for 1 h to obtain a reaction system.

The reaction system was transferred into a drying box and was held at 90° C. for 2.5 h for a hydrolysis reaction.

After the hydrolysis reaction was over, the bamboo was boiled in deionized water for 2 h and washed repeatedly until the aqueous solution was neutral. The washed bamboo was taken out and dried at 103° C. for 6 h to obtain mildew-proof bamboo.

The mildew resistance of the mildew-proof bamboo was tested according to the method described in Example 2, and the results are as follows:

(1) Initial Mildewing Time of Bamboo

For the mildew-proof bamboo prepared in Example 3, the initial appearance time of the mycelia was delayed. The initial appearance time of the *Aspergillus niger, Penicillium citrinum* and *Trichoderma viride* mycelia was delayed to the $3^{rd}$, the $8^{th}$ and the $5^{th}$ days, respectively; the initial appearance time of the blue stain fungus mycelium was delayed to the $12^{th}$ day.

(2) Mildewing Rate of Bamboo

The mildew-proof bamboo prepared in Example 3 was placed in a mildew test box for a 4-week mildew test. The results show that the mildewing rate of the mildew-proof bamboo in the four different fungal environments was reduced. After the treatment with the 6% CA solution, the mycelial infection areas of the *Aspergillus niger, Penicillium citrinum, Trichoderma viride* and blue stain fungus were analyzed and calculated, and the mildewing rates of the samples were 30%, 33%, 32% and 21%, respectively.

(3) Soluble Sugar Content in Hydrolysates and Soluble Sugars and Starch Content Remained in Bamboo After the treatment with the 6% CA solution, glucose and xylose in the hydrolysates were 348 mg/L and 370 mg/L, respectively. The residual soluble sugar and starch in the bamboo were 36 mg/g and 37 mg/g, respectively, and a weight loss rate of the bamboo was 6.7%.

Example 4

A CA solution with a mass concentration of 8% was prepared, and oven-dried bamboo samples (finely planed moso bamboo strips, 50 mm×20 mm×5 mm) were put into reaction kettles with the acid solution, where a mass ratio of the bamboo strip to the acid solution was 1:10. The bamboo strips were soaked under −0.08 MPa at 25° C. for 1 h to obtain a reaction system.

The reaction system was transferred into a drying box and was held at 90° C. for 2.5 h for a hydrolysis reaction.

After the hydrolysis reaction was over, the bamboo was boiled in deionized water for 2 h and washed repeatedly until the aqueous solution was neutral. The washed bamboo was taken out and dried at 103° C. for 6 h to obtain mildew-proof bamboo.

The mildew resistance of the mildew-proof bamboo was tested according to the method described in Example 2, and the results are as follows:

(1) Initial Mildewing Time of Bamboo

For the mildew-proof bamboo prepared in Example 4, the initial appearance time of the mycelia was delayed. The initial appearance time of the *Aspergillus niger* mycelium, *Penicillium citrinum* and *Trichoderma viride* mycelia was delayed to the $6^{th}$, the $10^{th}$ and the $7^{th}$ days, respectively; the initial appearance time of the blue stain fungus mycelium was delayed to the $12^{th}$ day.

(2) Mildewing Rate of Bamboo

The mildew-proof bamboo prepared in Example 4 was placed in a mildew test box for a 4-week mildew test. The results show that the mildewing rate of the mildew-proof bamboo in four different fungal environments was reduced. After the treatment with the 8% CA solution, the mycelial infection areas of the *Aspergillus niger, Penicillium citrinum, Trichoderma viride* and blue stain fungus were analyzed and calculated, and the mildewing rates of the samples were 21%, 23%, 22% and 15%, respectively.

(3) Soluble Sugar Content in Hydrolysates and Soluble Sugars and Starch Content Remained in Bamboo After the treatment with the 8% CA solution, glucose and xylose in the hydrolysates were 355 mg/L and 386 mg/L, respectively.

Example 5

A CA solution with a mass concentration of 10% was prepared, and oven-dried bamboo samples (finely planed moso bamboo strips, 50 mm×20 mm×5 mm) were put into reaction kettles with the acid solution, where a mass ratio of the bamboo strip to the acid solution was 1:10. The bamboo strips were soaked under −0.08 MPa at 25° C. for 1 h to obtain a reaction system.

The reaction system was transferred into a drying box and was held at 90° C. for 2.5 h for a hydrolysis reaction.

After the hydrolysis reaction was over, the bamboo was boiled in deionized water for 2 h and washed repeatedly until the aqueous solution was neutral. The washed bamboo was taken out and dried at 103° C. for 6 h to obtain mildew-proof bamboo.

The mildew resistance of the mildew-proof bamboo was tested according to the method described in Example 2, and the results are as follows:

(1) Initial Mildewing Time of Bamboo

After the treatment with the 10% CA solution, the initial appearance time of the mycelia was significantly delayed. The initial appearance time of the *Aspergillus niger* mycelium was delayed to the $7^{th}$ day, and the hyphae were distributed in sparse spots on the bamboo surface. The initial appearance time of the *Penicillium citrinum* and *Trichoderma viride* mycelia was delayed to the $13^{th}$ day and the $16^{th}$ day, respectively, and the initial appearance time of the blue stain fungus mycelium was delayed to the $14^{th}$ day. The results of the examples show that as the concentration of the CA increased, the initial mildewing time of the bamboo surface was significantly delayed. After the treatment with the high-concentration CA, the activity of mildew spores in the initial state was reduced, and the spread of the hyphae was greatly slowed down.

(2) Mildewing Rate of Bamboo

After the treatment with the 10% CA solution, the mycelial infection areas of the *Aspergillus niger, Penicillium citrinum, Trichoderma viride* and blue stain fungus were analyzed and calculated, and the mildewing rates of the samples were 13%, 17%, 10% and 10%, respectively. A damage value of the bamboo treated with the 10% citric acid solution was 1, and a control efficacy of the acid solution against the four tested fungi was 75%.

(3) Soluble Sugar Content in Hydrolysates and Soluble Sugars and Starch Content Remained in Bamboo After the treatment with the 10% CA solution, glucose and xylose in the hydrolysates were 392 mg/L and 412 mg/L, respectively. The residual soluble sugar and starch in the bamboo were 31 mg/g and 23 mg/g, respectively, and a weight loss rate of the bamboo was 7.6%.

Comparative Example 1

Untreated bamboo samples (finely planed moso bamboo strips, 50 mm×20 mm×5 mm) were used for comparison.

Figure 1:
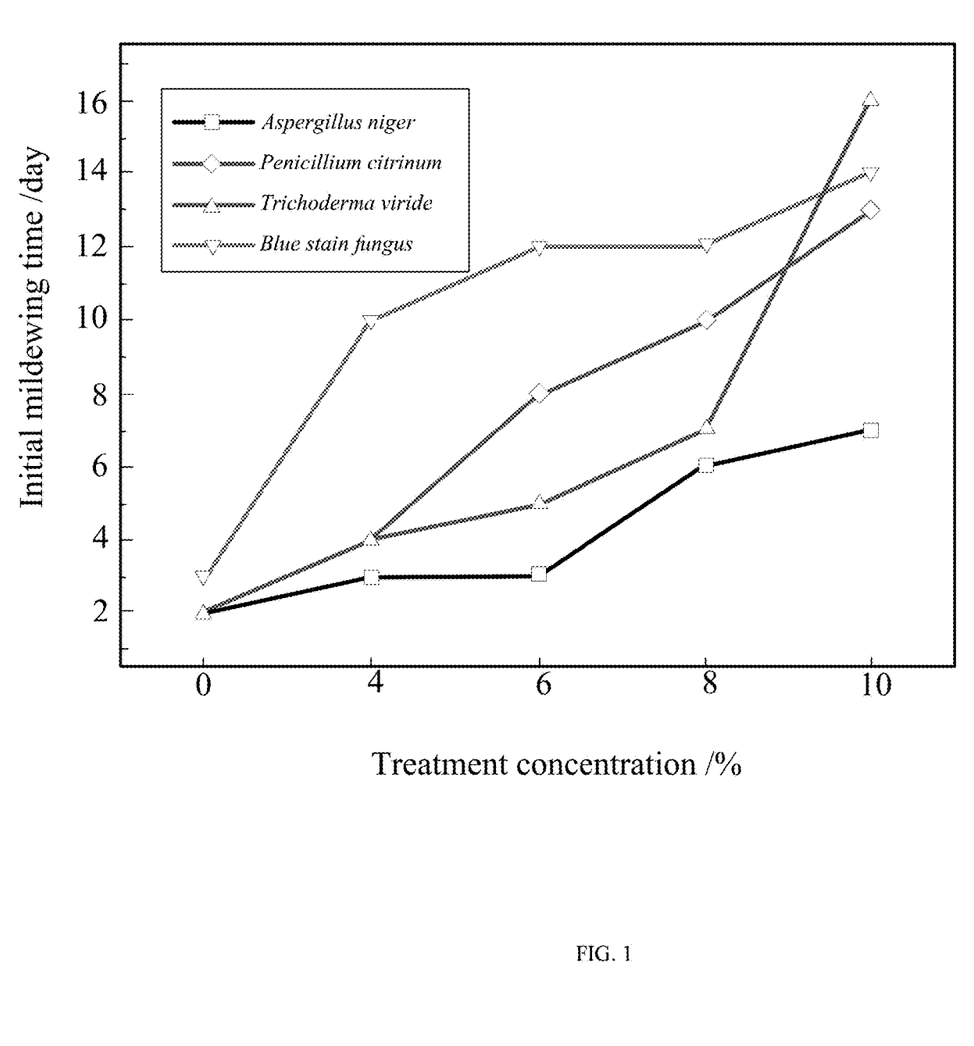
FIG. 1 shows initial mildewing time curves of mildew-proof bamboo of Comparative Example 1 and Examples 2 to 5 in different fungi.

The mildew resistance of the bamboo prepared in Comparative Example 1 and Examples 2 to 5 was tested according to the method in Example 2, and the results are listed in Table 1. According to the results in Table 1, the initial mildewing time curves of the mildew-proof bamboo of Comparative Example 1 and Examples 2 to 5 in different fungi were drawn, as shown in FIG. 1. It can be seen from FIG. 1 that the CA treatment helps to extend the mildewing time of the bamboo, and as the concentration of the CA increases, the initial time for mildewing and discoloration on the bamboo surface significantly lags behind.

TABLE 1

Initial mildewing time of bamboo of Comparative
Example 1 and Examples 2 to 5 in different fungi

| Examples | Initial mildewing time of bamboo in different fungi (d) | | | |
|---|---|---|---|---|
| | Aspergillus niger | Penicillium citrinum | Trichoderma viride | Blue stain fungus |
| Example 2 | 3 | 4 | 4 | 10 |
| Example 3 | 3 | 8 | 5 | 12 |
| Example 4 | 6 | 10 | 7 | 12 |
| Example 5 | 7 | 13 | 16 | 14 |
| Comparative Example 1 | 2 | 2 | 2 | 3 |

Figure 2:
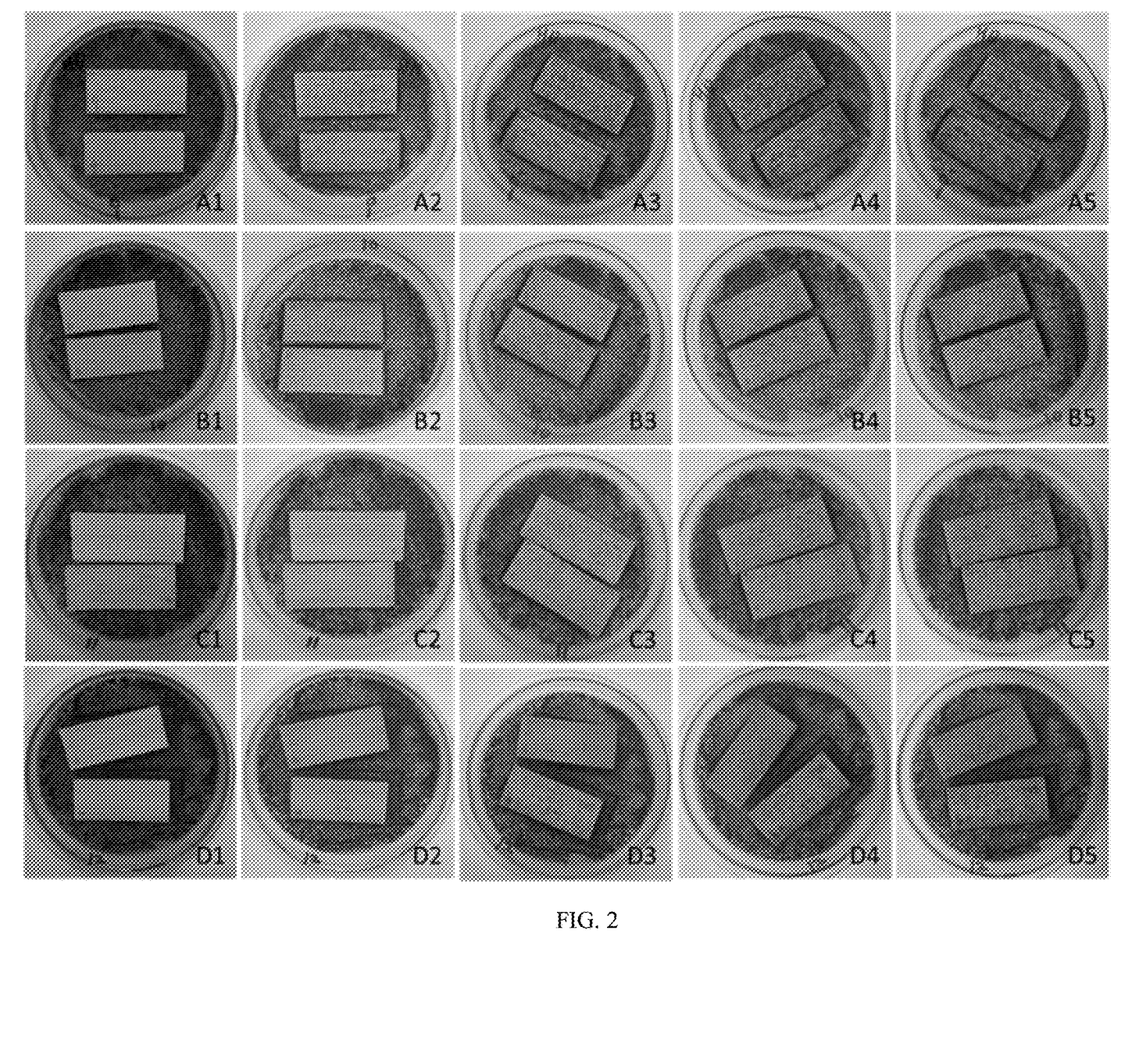
FIG. 2 shows an *Aspergillus niger* induced mildewing process of the bamboo under different concentrations of citric acid (CA) in Examples 2 to 5.

FIG. 2 shows an *Aspergillus niger* induced mildewing process of the bamboo under different concentrations of the CA in Examples 2 to 5. The columns A to D represent different mass concentrations of the CA solution, which were 4%, 6%, 8% and 10%, respectively. The rows 1 to 5 show a mildewing state of the samples on the 0th, $7^{th}$, $14^{th}$, $21^{st}$ and $30^{th}$ days, respectively. When the CA concentration was 4% and 6%, the hyphae of the *Aspergillus niger* appeared on the $3^{rd}$ day. When the concentration increased to 8% and 10%, the hyphae of the *Aspergillus niger* respectively appeared on the $6^{th}$ and $7^{th}$ days after the test, and the hyphae were distributed in sparse spots on the bamboo surface.

Figure 3:
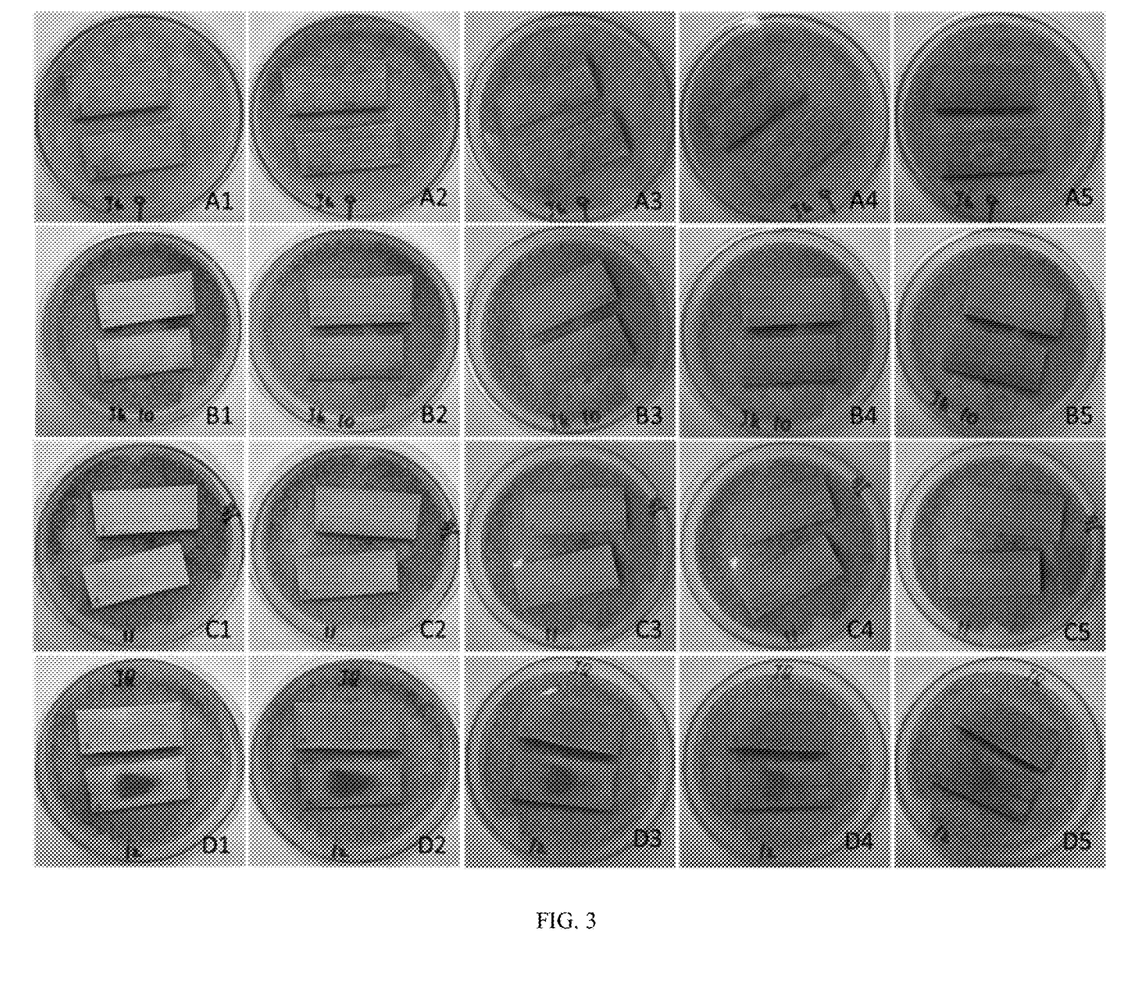
FIG. 3 shows a *Penicillium citrinum* induced mildewing process of the bamboo under different concentrations of CA in Examples 2 to 5.

FIG. 3 shows a *Penicillium citrinum* induced mildewing process of the bamboo under different concentrations of the CA in Examples 2 to 5. The columns A to D represent different mass concentrations of the CA solution, which were 4%, 6%, 8% and 10%, respectively. The rows 1 to 5 show a mildewing state of the samples on the 0th, $7^{th}$, $14^{th}$, $21^{st}$ and $30^{th}$ days, respectively. The concentration of the CA was increased from 4% to 10%, and the initial appearance time for the hyphae of the *Penicillium citrinum* was extended from the $4^{th}$, $8^{th}$ and $10^{th}$ days to the $13^{th}$ day.

Figure 4:
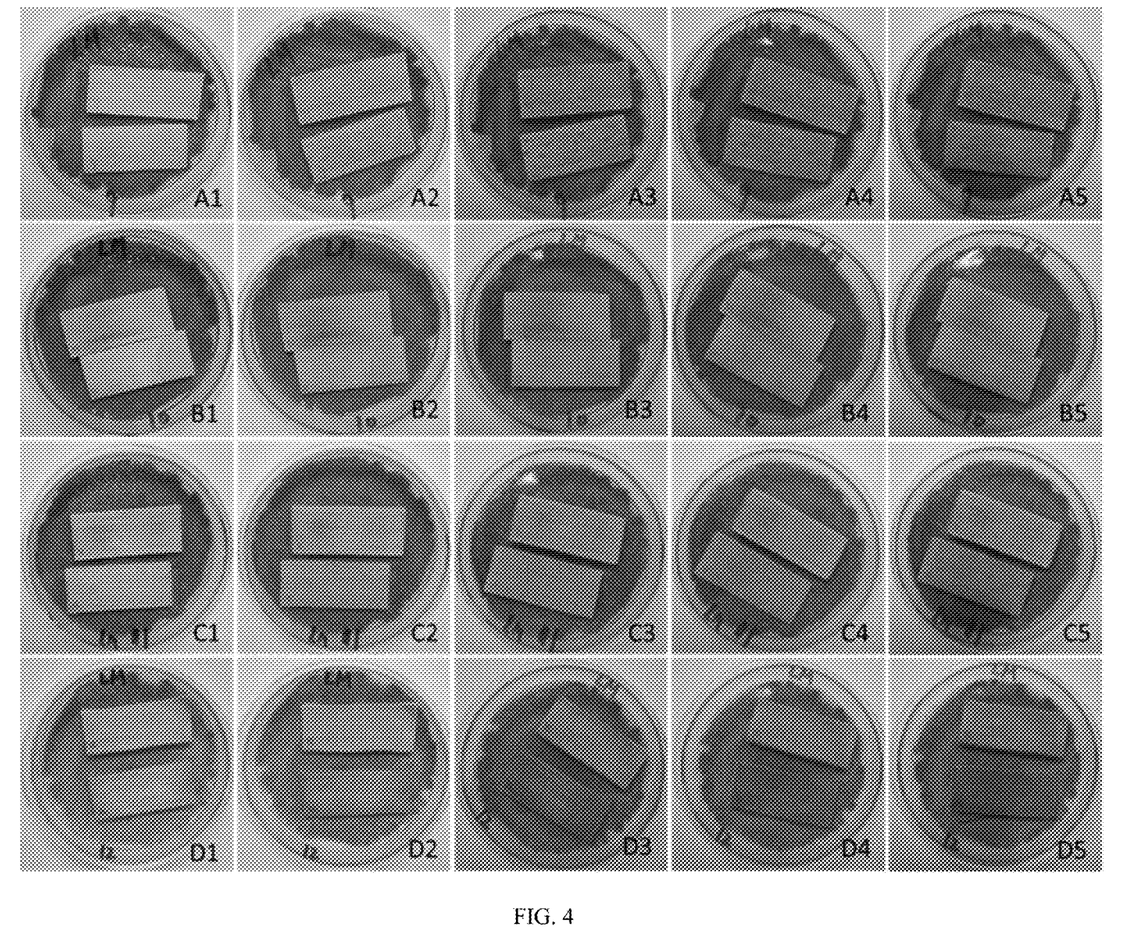
FIG. 4 shows a *Trichoderma viride* induced mildewing process of the bamboo under different concentrations of CA in Examples 2 to 5.

FIG. 4 shows a *Trichoderma viride* induced mildewing process of the bamboo under different concentrations of the CA in Examples 2 to 5. The columns A to D represent different mass concentrations of the CA solution, which were 4%, 6%, 8% and 10%, respectively. The rows 1 to 5 show a mildewing state of the samples on the $0^{th}$, $7^{th}$, $14^{th}$, $21^{st}$ and $30^{th}$ days, respectively. The concentration of the CA was increased from 4% to 10%, and the hyphae of the *Trichoderma viride* appeared on the 4th, $5^{th}$, $7^{th}$ and $16^{th}$ days, respectively.

Figure 5:
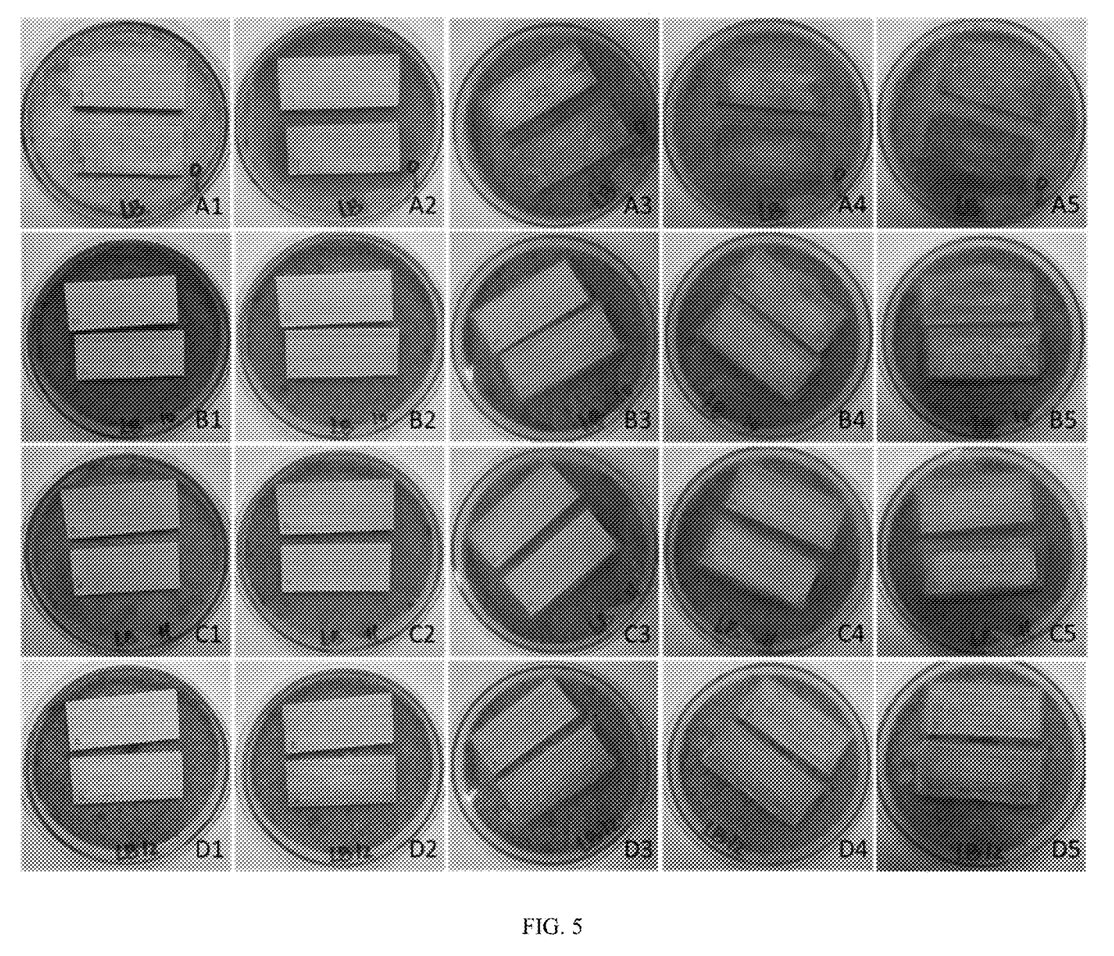
FIG. 5 shows a blue stain fungus induced mildewing process of the bamboo under different concentrations of CA in Examples 2 to 5.

FIG. 5 shows a blue stain fungus induced mildewing process of the bamboo under different concentrations of the CA in Examples 2 to 5. The columns A to D represent different mass concentrations of the CA solution, which were 4%, 6%, 8% and 10%, respectively. The rows 1 to 5 show a mildewing state of the samples on the $0^{th}$, $7^{th}$, $14^{th}$, $21^{st}$ and $30^{th}$ days, respectively. The concentration of the CA was increased from 4% to 10%, and the hyphae of the blue stain fungus appeared during the $10^{th}$ day to the $14^{th}$ day.

The present disclosure does not need to add a catalyst in the process of modifying the bamboo. The present disclosure utilizes the CA solution to undergo a hydrolysis reaction with the starch granules in the parenchyma cells of the bamboo, and efficiently removes the starch granules in the bamboo through the subsequent washing, so as to achieve the environment-friendly mildew prevention of the bamboo.

The above described are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A mildew prevention method for bamboo, comprising the following steps:
    soaking the bamboo in an acid solution to obtain a reaction system, wherein the reaction system gelatinizes a plurality of starches of the bamboo;
    subjecting the reaction system to a hydrolysis reaction to obtain a hydrolyzed product, wherein the hydrolysis reaction decomposes the gelatinized plurality of starches and generates monosaccharides;
        wherein the plurality of starches provides nutrients to mildew;
    washing the hydrolyzed product in sequence to obtain mildew-proof bamboo, wherein the washing removes a plurality of the monosaccharides from the mildew-proof bamboo; and
    drying the mildew-proof bamboo;
    wherein the hydrolysis reaction reduces the amount of the plurality of starches in the bamboo preventing mildew;
    wherein the acid solution is an inorganic acid solution or an organic acid solution.

2. The mildew prevention method for bamboo according to claim 1, wherein the inorganic acid solution is a hydrochloric acid solution; the organic acid solution is an acetic acid solution, a propionic acid solution, a citric acid (CA) solution or an oxalic acid solution.

3. The mildew prevention method for bamboo according to claim 1, wherein the soaking is conducted under a negative pressure of −0.08 MPa for less than 8 hours.

4. The mildew prevention method for bamboo according to claim 3, wherein a mass ratio of the bamboo to the acid solution is 1:(5-40).

5. The mildew prevention method for bamboo according to claim 3, further comprising:
    oven drying the bamboo prior to soaking to remove moisture from cell cavities of the bamboo;
    wherein the oven drying facilitates the acid solution's entrance into cell cavities of the bamboo to gelatinize the plurality of starches.

6. The mildew prevention method for bamboo according to claim 1, wherein a mass ratio of the bamboo to the acid solution is 1:(5-40).

7. The mildew prevention method for bamboo according to claim 1, wherein the soaking is conducted at a soaking temperature of 25° C. to 45° C.

8. The mildew prevention method for bamboo according to claim 1, wherein the hydrolysis reaction is conducted at a cooking temperature of 30° C. to 90° C. for 0.5 hours to 8 hours.

9. The mildew prevention method for bamboo according to claim 1, wherein the washing comprises water washing or alkaline washing and wherein the washing neutralizes the acid solution.

10. The mildew prevention method for bamboo according to claim 9, wherein the water washing is conducted under a heating condition.

11. The mildew prevention method for bamboo according to claim 1, wherein the drying is conducted at a drying temperature of 40° C. to 110° C. for 0.5 hours to 6 hours.

12. A mildew prevention method for bamboo, comprising the following steps:
- removing moisture from the bamboo;
- soaking the bamboo in an acid solution to obtain a reaction system, wherein the moisture removal facilitates an interaction between the acid solution and the bamboo to obtain the reaction system;
  - wherein the reaction system gelatinizes a plurality of starch granules of the bamboo;
  - wherein mildew utilizes the plurality of starch granules for nutrients to grow;
- subjecting the reaction system to a hydrolysis reaction to obtain a hydrolyzed product, wherein hydrolysis decomposes the gelatinized of plurality of starch granules; and
- washing and drying the hydrolyzed product in sequence to obtain mildew-proof bamboo, wherein the mildew-proof bamboo has a reduced amount of plurality of starch granules preventing mildew;
  - wherein the acid solution is an inorganic acid solution.

13. The mildew prevention method for bamboo according to claim 12, wherein the inorganic acid solution consists of a hydrochloric acid solution.

14. The mildew prevention method for bamboo according to claim 12, wherein the soaking is conducted under a negative pressure of −0.08 MPa for less than 8 hours.

15. The mildew prevention method for bamboo according to claim 12, wherein the acid solution reacts with at least an amino group or a hydroxyl group of the bamboo.

16. A mildew prevention method for bamboo, comprising the following steps:
- drying the bamboo to remove moisture;
- soaking the bamboo in an acid solution to obtain a reaction system, wherein the drying of the bamboo facilitates the acid solution's entrance into cell cavities of the bamboo, wherein the acid solution gelatinizes a plurality of starches in the cell cavities;
  - wherein the acid solution undergoes at least one of amidation or esterification with hydroxyl groups of the plurality of starches;
  - wherein the plurality of starches provide nutrients to mildew facilitating mildew growth;
- subjecting the reaction system to a hydrolysis reaction to obtain a hydrolyzed product, wherein the hydrolysis reaction decomposes the plurality of gelatinized starches and generates a plurality of monosaccharides; and
- washing and drying the hydrolyzed product in sequence to obtain mildew-proof bamboo, wherein the washing removes the monosaccharides from the mildew-proof bamboo,
  - wherein the washing is conducting under boiling conditions;
  - wherein the acid solution is an organic acid solution,
  - wherein the dried mildew-proof bamboo has a reduced amount of the plurality of starches preventing mildew.

17. The mildew prevention method for bamboo according to claim 16, wherein the organic acid solution is selected from a group comprising an acetic acid solution, a propionic acid solution, a citric acid (CA) solution or an oxalic acid solution.

18. The mildew prevention method for bamboo according to claim 16, wherein the hydrolysis reaction is conducted at a cooking temperature of 60° C. to 80° C. for 2.5 hours to 5 hours.

19. The mildew prevention method for bamboo according to claim 16, wherein the organic acid solution is oxalic acid.

20. The mildew prevention method for bamboo according to claim 16, wherein the organic acid solution is citric acid and has a mass concentration of 2% to 10%.

\* \* \* \* \*